United States Patent [19]

Lemond

[11] Patent Number: 5,178,814
[45] Date of Patent: Jan. 12, 1993

[54] QUENCHING METHOD AND APPARATUS

[75] Inventor: Phillip E. Lemond, Surfside Beach, S.C.

[73] Assignee: The Bouligny Company, Charlotte, N.C.

[21] Appl. No.: 743,083

[22] Filed: Aug. 9, 1991

[51] Int. Cl.⁵ .............................................. B29C 47/88
[52] U.S. Cl. ........................... 264/211.150; 264/237; 264/348; 425/72.2; 425/378.2
[58] Field of Search ..................... 264/211.14, 211.15, 264/237, 348; 425/72.2, 378.2, 464

[56] References Cited

U.S. PATENT DOCUMENTS

| | | | |
|---|---|---|---|
| 2,730,758 | 1/1956 | Morrell et al. | 264/168 |
| 3,135,811 | 6/1964 | Barnett et al. | 264/211.14 |
| 3,299,469 | 1/1967 | Charlton | 264/176.1 |
| 3,480,709 | 11/1969 | Jacob et al. | 264/237 |
| 3,632,719 | 1/1972 | Nozawa | 264/176.1 |
| 3,669,584 | 6/1972 | Yamada et al. | 425/173 |
| 3,672,801 | 6/1972 | Caldwell et al. | 425/71 |
| 3,695,858 | 10/1972 | Russell | 65/2 |
| 3,705,227 | 12/1972 | Fintel et al. | 264/237 |
| 3,759,642 | 9/1973 | Poteet, III | 425/72 |
| 3,959,057 | 5/1976 | Smith | 425/72.2 |
| 3,969,462 | 7/1976 | Stofan | 264/237 |
| 4,038,357 | 7/1977 | Boyes et al. | 264/168 |
| 4,227,906 | 10/1980 | Rieser | 65/2 |
| 4,259,048 | 3/1981 | Miani | 264/237 |
| 4,340,341 | 7/1982 | Cardell | 425/72.2 |
| 4,341,726 | 7/1982 | Wilkes | 264/130 |
| 4,378,325 | 3/1983 | Waite | 264/211.14 |
| 4,402,900 | 9/1983 | Berry, Jr. | 425/72.2 |
| 4,492,557 | 1/1985 | Ray et al. | 264/237 |
| 4,712,988 | 12/1987 | Broaddus et al. | 264/211.14 |
| 4,756,679 | 7/1988 | Stibal et al. | 425/72.2 |
| 4,838,774 | 6/1989 | Balk | 264/237 |
| 4,990,297 | 2/1991 | Stibal et al. | 264/211.14 |

FOREIGN PATENT DOCUMENTS

| | | |
|---|---|---|
| 143436 | 8/1980 | German Democratic Rep. |
| 387511 | 5/1959 | Japan . |
| 463926 | 10/1971 | Japan . |
| 4721251 | 6/1972 | Japan . |
| 517218 | 1/1976 | Japan . |
| 52-15615 | 2/1977 | Japan .................. 264/237 |
| 53-9293 | 4/1978 | Japan .................. 264/237 |
| 57-161113 | 10/1982 | Japan .................. 264/211.14 |
| 651055 | 3/1979 | U.S.S.R. . |
| 903385 | 2/1982 | U.S.S.R. . |
| 937545 | 6/1982 | U.S.S.R. .............. 264/211.14 |

OTHER PUBLICATIONS

Blueprint of The Bouligny Company, Drawing No. 756–E508, titled "Quench Ass'y", dated Jun. 8, 1988.

Primary Examiner—Jeffery Thurlow
Attorney, Agent, or Firm—Shefte, Pinckney & Sawyer

[57] ABSTRACT

A method and apparatus for quenching synthetic filaments such as synthetic yarn filaments as they exit a plurality of openings in an extrusion die in a downward direction and in an annular pattern. A quenching head is provided with quenching gas from a source, and the quenching head includes first and second nozzles which are disposed adjacent and beneath the extrusion die and within the annular pattern of filaments, and each of the nozzles is formed to cause the quenching gas to pass therefrom generally radially toward the annular pattern of filaments and at a predetermined angle directed upwardly with respect to a horizontal plane through the nozzle to provide a more uniform quenching of all of the filaments in the annular pattern.

12 Claims, 4 Drawing Sheets

QUENCHING METHOD AND APPARATUS

BACKGROUND OF THE INVENTION

The present invention relates generally to an arrangement in which filaments produced from heat softenable material are quenched by passing a gaseous quenching medium over the filaments as they are discharged from the orifices of an extruding die.

Filaments formed of synthetic polymer and the like such as, for example, synthetic yarn filaments, are typically formed by forcing molten polymer material through a plurality of openings or orifices in an extrusion die so that the molten material leaves each opening in the die as an individual strand or filament. When the material initially exits an opening in the extrusion die, it is still in a molten state, and it is generally known that these filaments must be quenched or cooled to convert the molten material to a hardened material, and with most filaments the quenching should preferably occur as soon as the molten filaments leave the die.

The particular apparatus used to quench molten filaments takes a variety of forms. For example, so-called quench sticks made of porous materials such as ceramics or sintered metals have been used as described, for example, in Stofan U.S. Pat. No. 3,969,482; Barnett U.S. Pat. No. 3,135,811; and Boyes U.S. Pat. No. 4,038,357, wherein the porous material is disposed within an annular pattern of vertically flowing filaments and extend generally from the extrusion die for a considerable distance below the die. In Morrell U.S. Pat. No. 2,730,758, cooling air is directed vertically upwardly by a jet disposed within the annular pattern of filaments so that the air strikes a discoidal deflector plate located immediately below the die whereby the air is deflected outwardly toward and through the filaments, and U.S. Pat. No. 3,695,858; U.S. Pat. No. 3,959,052; and Japanese Pat. Nos. 38-7511 and 51-7218 all disclose other variations of gaseous flow patterns extending generally across the vertically extending filaments.

Japanese Patent Nos. 46-34926 and 47-21251 disclose two similar versions of a quenching apparatus that includes a large plurality of vertical stacked discs having spacings therebetween through which the quenching gas is discharged radially over a substantial length of the vertically extending filaments, and the flow of the quenching gas from each of the spacings between the discs is controlled by the size of the openings in the center of the discs through which the quenching air flows to the radial spacings. In both of these patents, the quenching air is intended to flow radially and perpendicular to the vertically extending filaments, although in the first-listed patent there is a suggestion that the discs can be modified in some undescribed way to cause the air to flow at some undefined angle other than perpendicular to the filaments. Similarly, in Miani U.S. Pat. No. 4,259,048, a single discoidal nozzle is positioned immediately beneath the die and within the annular pattern of filaments, and the discoidal nozzle is specially formed to define at its periphery a single annular slit directed perpendicular to the vertical direction of extrusion of the filaments to provide a single laminar centralized discoidal jet of cooling air that impinges perpendicularly adjacent the just extruded filaments close to the holes in the die. Finally, commercial apparatus has been available which includes a quenching system having a discoidal nozzle formed with a single annular slot that directs the quenching air upwardly toward the lower surface of the die at a predetermined upward angle with respect to the horizontal, and while this nozzle overcomes or alleviates drawbacks of the perpendicularly directed flow of the nozzle disclosed in the aforesaid Miani patent, the single quenching air flow is difficult to properly control in terms of being able to obtain both a proper velocity and quantity of quenching air.

With regard to most filaments, it is important in terms of the quality of the filament that is to be produced that the filaments in the annular pattern of filaments be cooled as uniformly as possible as soon as they leave the die. As the size of dies increases and as the number of filament forming openings in a die increase, it becomes more difficult to obtain uniform cooling of all of the filaments. For example, where the cooling air is directed radially outwardly from the center of the annular pattern of filaments in a direction perpendicular to the vertical extent of the filaments, as disclosed in the aforesaid Miani patent, the quenching air immediately cools those filaments which are located at the radially innermost portion of the filaments in the annular pattern, but as the quenching air progresses outwardly through the annular pattern of filaments, the downward drag exerted in the quenching air by the rapidly flowing filaments tends to direct the quenching air downwardly so that by the time the quenching air actually reaches the outermost portion of the annular pattern, it is located substantially below the bottom face of the die. This can result in these outermost filaments not being cooled quickly enough and can adversely affect the uniformity of the size and consistency of the filament which, in turn, affects the performance of the filaments, and the "hand" of the filaments if they are to be used as synthetic yarn. This adverse affect can sometime be partially affected by increasing the velocity of the quenching air as it leaves the nozzle so that it reaches the outermost filaments more quickly, but if the exit velocity of the quenching air is too high, it can actually break the innermost filaments. Where the quenching gas is concentrated in a single nozzle, as discussed above, it is much more difficult to control the air flow so that it obtains a proper balance between velocity and the quantity of the air flow.

In accordance with the present invention a unique quenching apparatus is provided which addresses and alleviates some of the problems with known apparatus of this type.

SUMMARY OF THE INVENTION

The present invention provides a method and apparatus for quenching a plurality of filaments, such as synthetic yarn filaments, as they exit at a plurality of openings in a extrusion die which is formed to cause such filaments to exit vertically downwardly in an annular pattern and in substantially straight, parallel paths. A source of quenching gas is provided, and a quenching head is connected to the source of quenching gas and is adapted to be disposed adjacent and beneath the extrusion die and within the annular pattern of filaments exiting therefrom, and this quenching head includes a first nozzle arrangement formed to cause the quenching gas to pass therefrom generally radially toward the annular pattern of filaments as they exit the die openings, and at a predetermined angle directed upwardly with respect to a horizontal plane through the first nozzle, and a second nozzle arrangement which is located beneath and adjacent the first nozzle arrangement and formed to cause quenching gas to pass therefrom also in a direction generally radially and toward the annular pattern of filaments and at predetermined angle directly upwardly with respect to a horizontal plane through the second nozzle.

One significant advantage obtained from the aforesaid arrangement is that the quenching air is initially directed upwardly so that the above-discussed downward drag imposed on the quenching air by the downwardly moving filaments is offset and there is a more uniform cooling of all of the innermost and outermost groups of filaments in the annular pattern.

In the preferred embodiment of the present invention, the upwardly directed angle of the flow of quenching air from the first nozzle arrangement is different from, and less than, the upwardly directed angle of flow of quenching gas from the second nozzle arrangement. The angle of flow from the first nozzle arrangement is preferably in the range of 4° to 6° relative to a horizontal plane through the first nozzle arrangement and the flow from the second nozzle is preferably in the range of 8° to 10° relative to a horizontal plane through the second nozzle. Each of the first and second nozzle arrangements includes an annular gap through which the quenching gas exits therefrom and both of these nozzles are selectively adjustable to vary the sizes of these annular gaps. Preferably, when producing synthetic yarn filaments, the size of the lower annular gap is substantially larger than the upper annular gap, which improves the "hand" of the filaments. Also, the source of the quenching gas preferably includes two concentric flow paths for supplying quenching gas to the first and second nozzle arrangements, respectively.

DESCRIPTION OF THE PREFERRED EMBODIMENT

Figure 1:
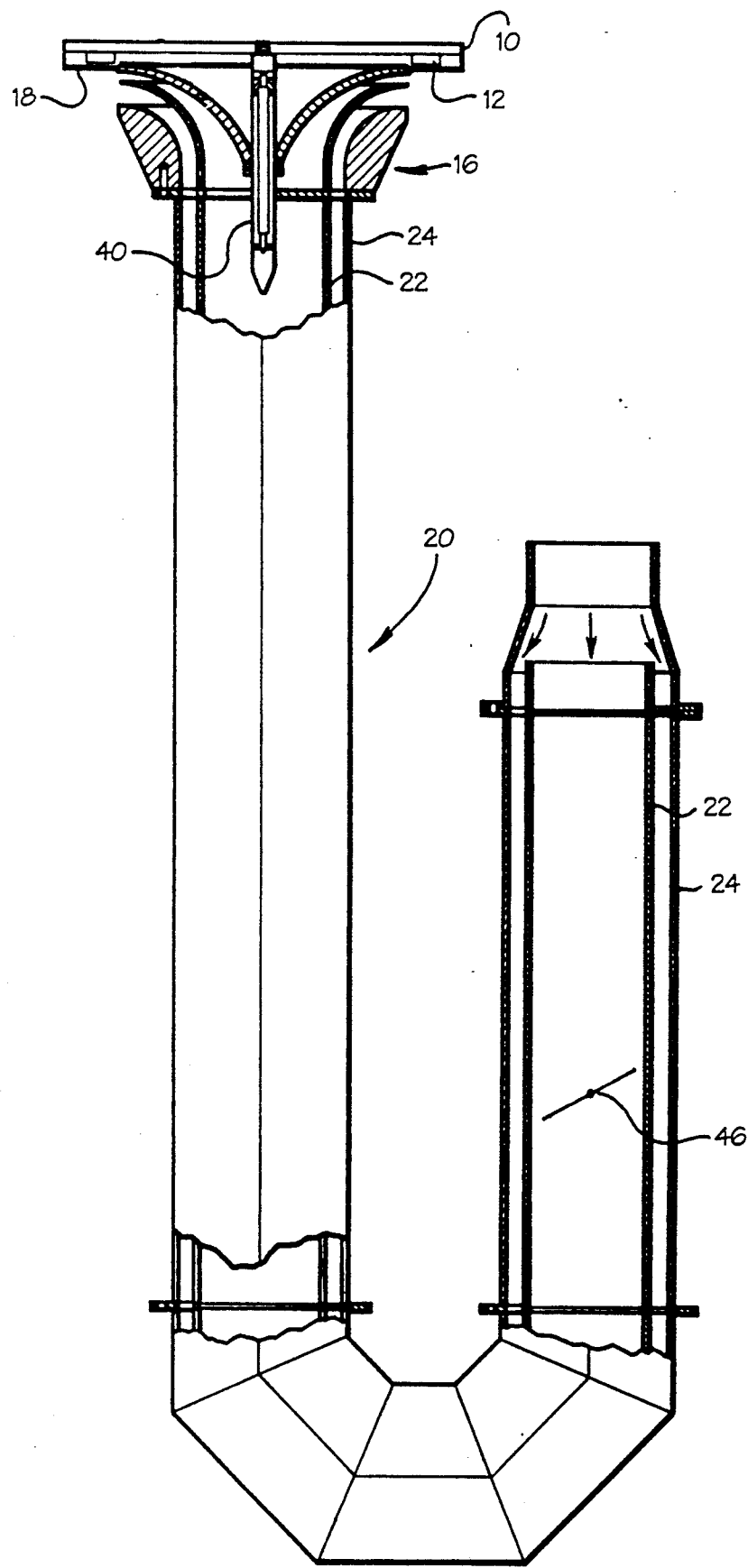
FIG. 1 is an elevational view illustrating the preferred embodiment of the quenching apparatus of the present invention.

Looking now in greater detail at the accompanying drawings, FIG. 1 is a general side elevational view illustrating the quenching apparatus of the present invention. The bottom portion of a conventional circular extrusion die 10 is illustrated in FIG. 1 and it includes an annular band 12 which includes a large number of small apertures or openings (not shown) through which a molten material, such as a molten polymeric material, is forced under pressure to form continuous filaments 14 (see FIG. 3) extending vertically from each opening, all in a conventional manner that is well known in the art. For example, in a typical extrusion die for 4-6 denier per filament (dpf) the die 10 may have 40,000 openings or orifices in the annular band 12.

A dual quenching nozzle assembly 16 is mounted directly beneath and closely adjacent the bottom surface 18 of the extrusion die 10, and the lower end of the nozzle assembly 16 is in fluid communication with a supply system 20 through which quenching air is supplied to the nozzle assembly 16, the supply system 20 including an inner tubular conduit 22 which provides a first flow path for the quenching air and an outer conduit 24 that extends co-axially with, and in spaced relation to, the inner conduit 22 to form a second flow path for the quenching air.

Figure 2:
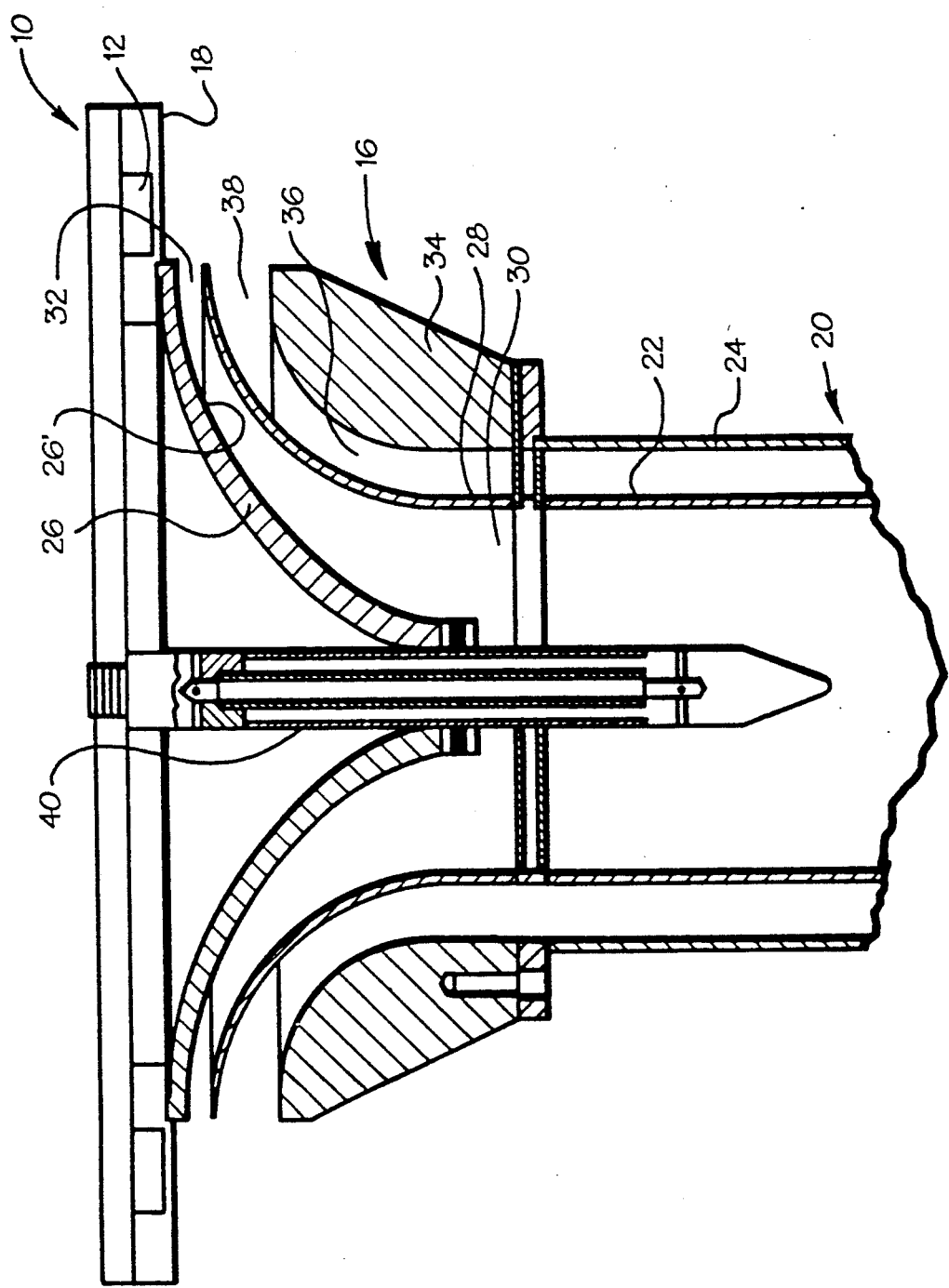
FIG. 2 is a detailed view of the first and second nozzle arrangements of the quenching apparatus of the present invention.

As best seen in FIG. 2, the nozzle assembly 16 is comprised of a fixed upper element 26 that is generally conical in shape and with its exposed outer surface 26' being shaped with a predetermined curvature. An intermediate conical member 28 is mounted beneath the upper fixed element 26, and it has an upper curved surface configuration which cooperates with the outer surface 26' of the upper fixed element 26 to form a first nozzle 30 that is in fluid communication at its lower inlet end with the quenching air flow path established by the inner conduit 22 and that includes a continuous annular gap 32 through which the quenching gas is discharged from the first nozzle 30. A lower nozzle element 34 is mounted beneath, and spaced from, the intermediate conical element 28 so that the facing curved surface portions thereof form a second nozzle 36 which is in fluid communication at its lower inlet end with the quenching air flow path formed by the outer conduit 24, and which includes a continuous annular gap 38 disposed directly beneath the upper annular gap 32.

In the preferred embodiment of the present invention, the upper fixed element 26 is mounted directly to the bottom surface 18 of the extrusion die is by a vertically extending mounting spike 40 and the intermediate conical element 28 and the lower nozzle element 34 are mounted on the upper end of the conduits 22,24. As best seen in FIG. 1, the inlet end of the outer conduit 24 is open so that it can be connected directly to any conventional source of quenching air (not shown), such as a variable speed blower, and the inlet end of the inner conduit 22 is also open so that the supply of quenching air is divided into separate flow paths established by the conduits 22,24 which direct the quenching air into the first and second nozzles 30,36, respectively. The conduits 22,24 and the intermediate and lower nozzle elements 28,30 mounted thereon can be moved vertically by any conventional mechanical arrangement (not shown) in a manner well-known to the art, and this vertical movement can be utilized to vary the size of the upper annular gap 32 by moving the intermediate conical element 28 toward or away from the upper fixed element 26. Also, the size of the lower gap 38 may be adjusted by selecting an alternate form of the intermediate conical element 28 which will have a predetermined relationship with the lower nozzle element 34 to form the lower gap 38 with any desired size. By adjusting the gaps 32,38, it is possible to vary the velocity of the quenching air as it is discharged from the first and second nozzles 30,36 and is also possible to vary the ratio or proportionate part of the total volume of quenching air that is distributed through each of the two nozzles 30,36. When the filaments to be quenched are synthetic yarn filaments, it has been found in prototypes of the present invention that the "hand" of such filaments is improved when the size of lower annular gap 38 is significantly larger than the size of the upper annular gap 32 (e.g., at least twice as big).

As best seen in FIG. 2, one of the significant features of the present invention resides in the fact that the first and second nozzles 30,36 are designed so that the quenching air is discharged therefrom in a direction that is generally radial and toward the pattern of filaments 14, but which is directed upwardly at a small angle relative to a horizontal plane passing through the respective nozzles 30,36. While the exact angle at which the quenching air is directed upwardly is not critical, it should be designed to significantly offset the downward drag that is imposed on the quenching air by the downward movement of the filaments 14 as the quenching air passes through the annular pattern of such filaments, all as will be explained in greater detail below. It has been found in experimental prototype apparatus used to form synthetic yarn filaments (e.g., polypropylene) that particularly good quenching results are obtained if the quenching gas is discharged from the first nozzle 30 at an angle of 5° with respect to a horizontal plane through that nozzle and if the quenching air from the second nozzle is discharged at an angle of 9° to such a horizontal plane. However, it is believed that angles within the range of 4° to 6° for the first nozzle and 8° to 10° for the second nozzle will also provide unusually good results.

Figure 3:
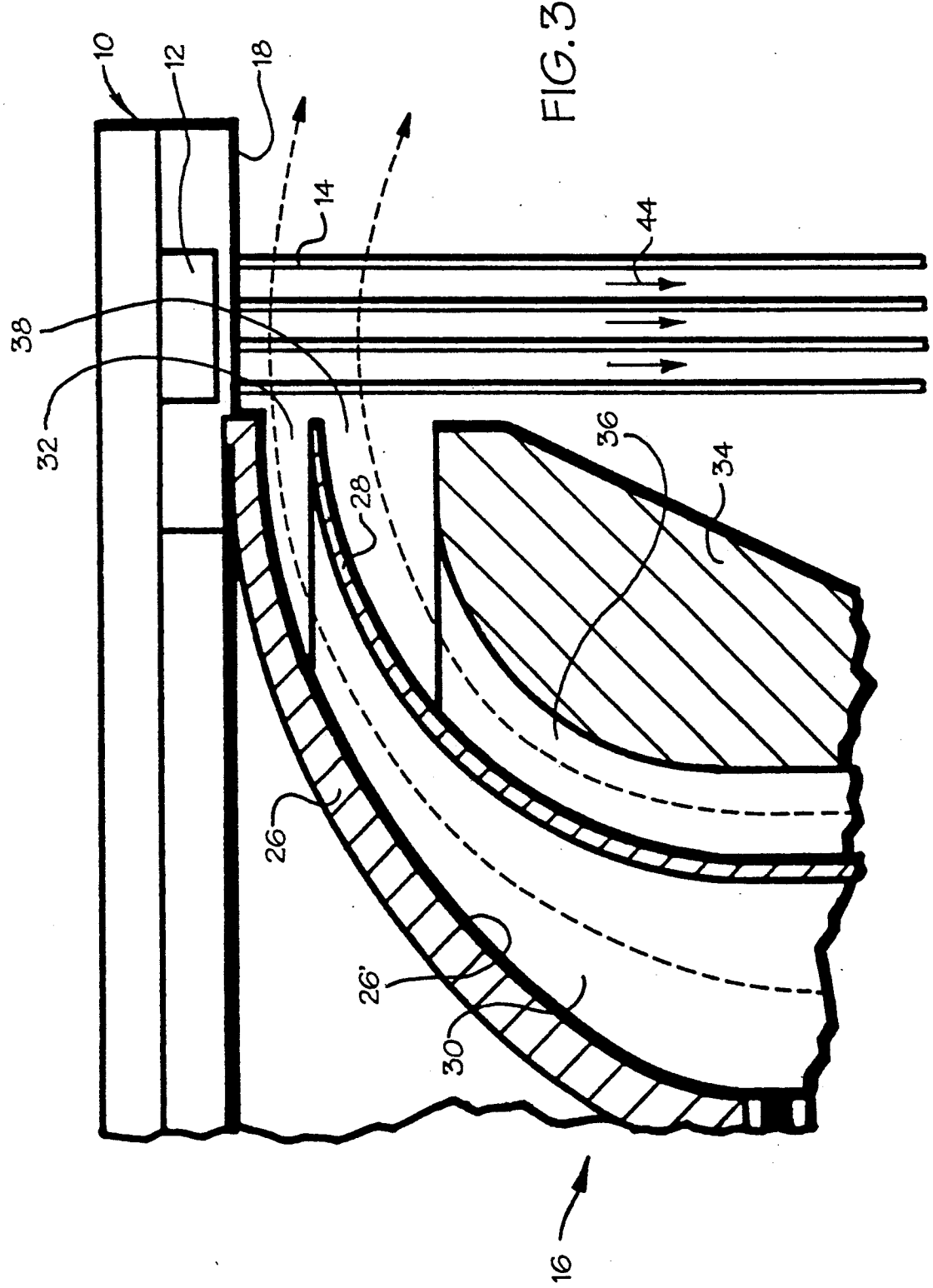
FIGS. 3 and 4 are schematic views illustrating in diagrammatic form, a comparison of the general flow paths of the quenching gas as it leaves the nozzle assembly of the present invention and a corresponding prior art flow path.
Figure 4:
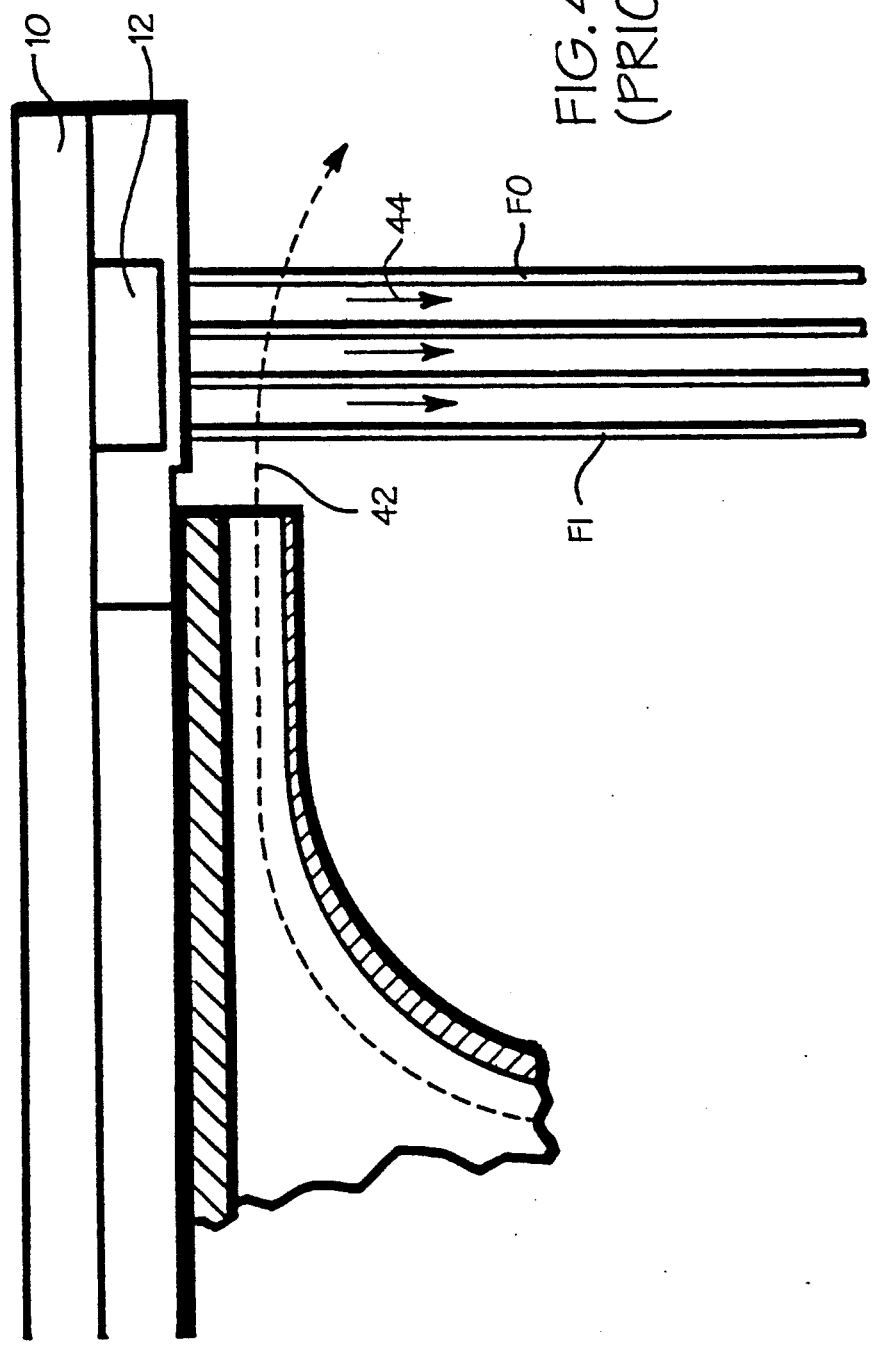

FIGS. 3 and 4 illustrate, in diagrammatic and somewhat exaggerated form, a comparison of the flow paths of the quenching air discharged by the nozzle assembly 16 of the present invention (FIG. 3) and a conventional prior art nozzle (FIG. 4) in which the quenching air is discharged radially from a single nozzle in a direction perpendicular to the vertical movement of the filaments as they leave the extrusion die. In both FIGS. 3 and 4, only four filaments are shown diagrammatically for clarity of illustration, but it will of course be understood that the actual numbers of filaments would be substantially greater than four, particularly in large denier filaments wherein there may be 40,000 openings or apertures in the annular band 12 of filaments in the extrusion die as discussed above. In the typical prior art arrangement illustrated in FIG. 4, the quenching air is discharged from the nozzle in a horizontal direction as indicated by the dotted line 42 and perpendicular to the downward vertical movement of the filaments which is indicated by the direction arrows 44. As the quenching air makes contact with the filaments and passes outwardly therethrough, the surfaces of the moving filaments will create a downward drag on the quenching air so that the path of the quenching air assumes a downwardly directed curvature as indicated generally by the dotted line 42. As a result, it will be noted that when the quenching air reaches the radially outermost portion of the filaments, which are designated in FIG. 4 as FO, it will engage such filaments FO at a location that is substantially spaced beneath the bottom surface of the extrusion die as compared with the innermost group of filaments (designated as FI), as well as the intermediate groups of filaments. This is undesirable because, as discussed above, the quality of the filaments is adversely affected when the molten filaments are not cooled as quickly as possible after they leave the extrusion die. More specifically, if the path of the quenching air assumes the downward curve as shown generally by the dotted line 42 in FIG. 4, the molten filaments exiting the openings in the extrusion die are cooled by the quenching air at a progressively lower point in their spacing from the extrusion die as the quenching air moves radially outwardly, and they tend to remain in a molten state for a longer period of time than is desirable and, as a result, they tend not to be uniform in size, which adversely affects the quality of the filaments. By contrast, the upward angle at which the quenching air is discharged from the nozzles 30,36 (FIG. 3) in accordance with the present invention, offsets the downward drag imposed on the quenching air by the downwardly moving filaments and, as a result, there is a more even distribution of the quenching air across the radial extent of the filaments 14 so that the quenching air reaches the outermost portion of the filaments at a location which is more closely adjacent the point at which the molten filaments leave the lower surface 18 of the extrusion die 10, thereby alleviating the adverse affect on the size and uniformity of the filaments which can occur in prior art arrangements as discussed above.

Apart from the advantages obtained from the upwardly directed flow of the quenching and the nozzle assembly 16 of the present invention, it has also been found that the size and uniformity of the filaments 14 are improved by using the dual quenching nozzles 30,36, with one located above the other. As discussed above, if the exit velocity of the quenching air as it leaves the nozzle is too high, the air tends to form what is generally referred to as an "air knife" which tends to break the radially innermost filaments 14 in the annular pattern of filaments, but if the velocity is adjusted to a point where it is too low, then the radially outermost portion of the filaments do not get cooled quickly or properly, with the adverse affects discussed above. In prior art arrangements like that shown in FIG. 4 where the entire volume of quenching air is discharged from a singular nozzle, it is more difficult to control the velocity of the quenching air so that it is correctly between the extremes of being too low or too high. On the other hand, in the present invention, the total volume of quenching air is selectively divided between the inner and outer conduits 22,24, each of which can be individually controlled by changing the total volume of quenching air that is fed to the conduits 22,24 by using a conventional damper 46 or other control to vary the ratio of the total volume of quenching air that is fed through the two conduits 22,24 and/or by adjusting the size of the annular gaps 32,38. This wide range of options permits a broader range of control of the quenching air and can result in a significantly improved filament quality.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for quenching synthetic filaments such as synthetic yarn filaments as they exit at a plurality of openings for an extrusion die which is formed to cause said filaments to exit vertically downwardly in an annular pattern and in substantially straight parallel paths, said quenching apparatus including:

a) a source of quenching gas; and
b) quenching head means connected to said source of quenching gas and adapted to be disposed adjacent and beneath said extrusion die and within said annular pattern of filaments exiting therefrom, said quenching head means including:
   i) first nozzle means formed to cause said quenching gas to pass therefrom in a generally radial direction toward said annular pattern of filaments as they exit said die openings and at a predetermined angle directed upwardly with respect to a horizontal plane through said first nozzle means; and
   ii) second nozzle means located beneath and adjacent said first nozzle means and formed to cause said quenching gas to pass therefrom in a generally radial direction and toward said annular pattern of filaments at a point beneath the point where the quenching gas directed by said first nozzle means initially passes over said filaments, said second nozzle means causing said quenching gas to flow at a predetermined angle directed upwardly with respect to a horizontal plane through said second nozzle means.

2. Apparatus for quenching synthetic filaments as defined in claim 1 wherein said predetermined upwardly directed angle of said flow of said quenching gas from said first nozzle means is different from said predetermined upwardly directed angle of said flow of said quenching gas from said second nozzle means.

3. Apparatus for quenching synthetic filaments as defined in claim 1 wherein said predetermined upwardly directed angle of said flow from said first nozzle means is in the range of 4° to 6° relative to said horizontal plane through said first nozzle means.

4. Apparatus for quenching synthetic filaments as defined in claim 3 wherein said predetermined upwardly directed angle of said flow from said second nozzle means is in the range of 8° to 10° relative to said horizontal plane through said second nozzle means.

5. Apparatus for quenching synthetic filaments as defined in claim 1 wherein said first and second nozzle means each include an annular gap through which such quenching air exits therefrom and wherein said first and second nozzle means are each selectively adjustable to vary the degree of said annular gaps.

6. Apparatus for quenching synthetic filaments as defined in claim 5 wherein the size of said annular gap of said second nozzle means is significantly larger than the size of the said annular gap of said first nozzle means.

7. Apparatus for quenching synthetic filaments as defined in claim 1 wherein said source of quenching gas includes two concentric flow paths for supplying quenching gas to said first and second nozzle means, respectively, and includes control means for varying the ratio of the total quantity of quenching gas which is supplied to said first and second nozzle means.

8. A method of quenching a plurality of filaments such as synthetic yarn filaments as they exit at a plurality of openings in an extrusion die which is formed to cause said filaments to exit in a vertically downward direction in an annular pattern and in substantially straight parallel paths, said method comprising the steps of:

a) providing a source of quenching gas;
b) creating first and second flow paths for said quenching gas directed generally radially outwardly from a position within said annular pattern of exiting filaments, with said first flow path being disposed above said second flow path, said first and second flow paths each being directed upwardly at a predetermined angle to a horizontal plane passing through said annular pattern of exiting filaments such that the downward forces imposed on said quenching gas by its contact with the downwardly exiting filaments will be at least partially offset by the upwardly directed first and second flow paths of said quenching gas.

9. A method of quenching a plurality of synthetic filaments as defined in claim 8 wherein said predetermined angle of said first flow path is lesser than said predetermined angle of said second flow path.

10. A method of quenching a plurality of synthetic filaments according to claim 7 wherein said common source of quenching gas is provided for said first and second flow paths, and said common source is divided into two flow paths having a predetermined and selectively variable rates for supplying quenching gas to said first and second flow paths.

11. A method of quenching a plurality of synthetic filaments according to claim 7 wherein said first and second flow paths are each caused to flow through an annular gap, and the size of said annular gaps are selectively varied without changing said predetermined angles at which said first and second flow paths are directed upwardly from said horizontal plane.

12. A method of quenching a plurality of synthetic filaments according to claim 7 wherein said predetermined angles of said first and second flow paths are selected to offset said downward forces imposed on said quenching gas by said exiting filaments to such an extent that the quenching gas will pass over the radially outermost portion of filaments in said annular pattern at approximately the same spacing from said die as it passes over the radially innermost portion of filaments in said annular pattern.

* * * * *